United States Patent [19]

Tarsia

[11] 4,433,907
[45] Feb. 28, 1984

[54] LENS ALIGNMENT STRUCTURE

[75] Inventor: Giuseppe Tarsia, Valley Stream, N.Y.

[73] Assignee: Berkey Photo, Inc., White Plains, N.Y.

[21] Appl. No.: 349,775

[22] Filed: Feb. 18, 1982

[51] Int. Cl.³ ............................................. G03B 27/52
[52] U.S. Cl. ..................................... 355/55; 350/254; 352/142; 354/286
[58] Field of Search ....................... 355/52, 55, 18, 69; 354/286; 350/252, 254, 257; 352/142

[56] References Cited

U.S. PATENT DOCUMENTS

| Re. 30,164 | 12/1979 | Eppe et al. | 355/69 |
|---|---|---|---|
| 2,285,768 | 6/1942 | Drucker | 350/255 |
| 2,307,345 | 1/1943 | Zuber | 350/257 |
| 2,335,700 | 11/1943 | Rogers | 355/52 |
| 2,496,269 | 2/1950 | Cisski | 352/142 |
| 2,574,072 | 11/1951 | Updegraff | 355/184 |
| 2,691,322 | 10/1954 | Wittel | 350/257 |
| 2,887,937 | 5/1959 | Gebele | 350/252 X |
| 2,889,761 | 6/1959 | Gebele | 350/252 X |
| 3,045,574 | 7/1962 | Planert | 350/254 |
| 3,049,970 | 8/1962 | Steinberg | 350/252 |
| 3,469,912 | 9/1969 | Wick | 355/18 |
| 3,834,811 | 9/1974 | Rathburn | 355/18 |
| 3,871,764 | 3/1975 | Nishizawa | 355/18 |
| 3,977,781 | 8/1976 | Eppe et al. | 355/18 |
| 4,208,102 | 6/1980 | Ohkura | 350/252 |
| 4,230,403 | 10/1980 | Hashimoto et al. | 354/286 |
| 4,266,855 | 5/1981 | Mohr | 350/254 |

Primary Examiner—Richard A. Wintercorn
Attorney, Agent, or Firm—Neuman, Williams, Anderson & Olson

[57] ABSTRACT

An adjustable lens mounting device is provided in a photographic enlarger apparatus for adjusting the pitch and roll of the lens stage to achieve optimum alignment of a lens element therein. Pitch adjustment is provided by a pair of elements having complementary convex-concave longitudinal surfaces that are connected together for rotational movement. Roll adjustment is provided by a pair of elements connected together in planar face to face alignment for pivoting about a central point. The adjustable lens mounting device incorporates a lens holder which permits rotation of a screw-coupled lens element relative to the lens stage, so that it may be selectively rotatively positioned for convenient viewing. Also provided is a rotatable turret for selectively carrying a plurality of lens elements in and out of the optical axis.

23 Claims, 5 Drawing Figures

LENS ALIGNMENT STRUCTURE

BACKGROUND OF THE INVENTION

This invention relates to projection devices, such as photograhic enlargers and cameras and the like, and more particularly to a lens mounting and alignment apparatus wherein the pitch and roll of the lens stage may be selectively adjusted to achieve a necessary or desirable optical alignment of a lens element therein with respect to the camera center, a photographic object, the optical axis of the enlarger, a transparency, or the base upon which the image is to be focused.

In some photographic applications it is common to provide a vertical support structure which permits adjustable positioning therealong of a photograhic apparatus. For example, an overhead enlarger with a light source may be vertically positioned over photosensitive printing paper to project a light image thereon. In order to obtain both image clarity and high resolution, it is necessary that the lens element be positioned for optimum alignment with respect to the image bearing medium and the surface upon which the image is projected. Additionally, in some photographic applications, it is desirable to adjust the position of the lens element to coincide with camera inclinations or to create enlargement perspective effects.

In general, the known mechanisms for effecting axial and angular adjustments of lens elements have not been constructed and positioned for maximum convenience of use and for precise operation. To the extent they have been included in enlargers in the past, they have been awkward and difficult to operate, or have merely offered adjustment in the axial direction. Thus, as known alignment devices have suffered wear and tear, the lens stage has become misaligned with no provision for realignment. Moreover, alignment has been a time consuming process requiring special tools not readily available. Still further, the occassional need to realign the lens stage for a different lens or in order to create special effects has exacerbated the aforenoted problems.

SUMMARY OF THE PRESENT INVENTION

It is an object of the present invention to overcome the deficiencies experienced with prior lens mounting adjustment mechanisms. More specifically, it provides an adjustable lens stage alignment device which is simple in construction and operation, while being superior to prior art devices with respect to performance, reliability, accuracy, and range of adjustment.

It is another object of the present invention to provide an adjustable lens mounting device for orienting the pitch and roll of the lens stage to achieve optimum alignment of a lens element therein.

It is still another object of this invention to provide an adjustable lens mounting device having a lens holder which permits rotation of a screw-coupled lens element relative to the lens stage, so that once threaded into position the lens element may be selectively rotatively positioned.

It is yet another object of this invention to provide a lens stage which is adjustable relative to an optical axis of the apparatus and also includes a rotatable turret for selectively carrying a plurality of lens elements in and out of an optical path.

These and other objects of the invention will be apparent hereinafter from the specification which describes the best mode for practicing the invention as currently known, its use and operation, and a preferred embodiment. Reference should also be made to the drawings, which constitute a part of the disclosure, and the subject matter claimed.

Generally, the objects of the present invention are accomplished in an adjustable lens mounting system having a lens stage interposed in an optical path for focusing an image from a transparency. The lens stage is characterised as having a longitudinal axis extending from the front of the photographic apparatus to the rear, and a lateral axis extending from left to right. The lens mounting system includes pitch alignment means for selectively adjusting the rotation of the lens stage about its lateral axis, and roll alignment means for selectively adjusting the rotation of the lens stage about its longitudinal axis. A lens mount means for positioning a lens element in axial alignment with the optical path is associated with the lens stage.

Pitch alignment of the lens stage is effected through the cooperative movement of a beam having a convex face and a bracket means having a concave face conforming substantially to the convex face of the beam. The beam and bracket means are slidingly engaged by a pin and slot arrangement. Adjustment means for the pitch alignment components, in the form of a screw biased against the lower edge of the concave face of the bracket means, permit the operator to position the bracket means, which may then be locked into frictional engagement with the beam at a selected pitch. Roll alignment of the lens stage is effected through the cooperative movement of a base member and a generally flat side of the beam. The flat surfaces of the base member and the beam are maintained in sliding pivotal contact by a pivot bolt connecting their centers. Adjustment means for roll alignment, in the form of screws biased against opposing ends of the base member, permit pivotal rotation of the beam and bracket means associated therewith with respect to the base member, and also serve to lock them into position.

It will be appreciated that the bracket means may be connected to a number of lens stage components in a variety of ways. For example, it is contemplated in the present invention to equip the lens stage, connected with the pitch and roll alignment means, with a rotatable turret for selectively carrying a plurality of lens elements in and out of alignment with an optical axis.

It is also contemplated, within the present invention, to utilize a variety of lens holders in combination with the pitch and alignment means. One such holder disclosed herein is a lens mount which permits rotation of a screw-coupled lens element therein relative to the lens stage, so that the lens element may be selectively rotatively positioned for convenient viewing after the screw threads have been seated. This lens mount includes a threaded lens element receiving tube, and means for selectively rotatively positioning the receiving tube with respect to the lens stage and holding it in place. Utilizing the present invention, a photographic apparatus operator can insert a new lens element into the optical path by either screw-coupling or rotation of a turret, and can then turn the lens element and receiving tube to a convenient position for viewing the f-stop indicator from the front of the enlarger.

From the description thus far provided, it is apparent that the proposed adjustable lens mounting system may be used for a number of photographic apparatus structures or projectors such as are well known in the art.

BRIEF DESCRIPTION OF THE DRAWINGS

For a more complete understanding of this invention, reference will now be made to the drawings wherein.

DESCRIPTION OF THE PREFERRED EMBODIMENT

Figure 1:
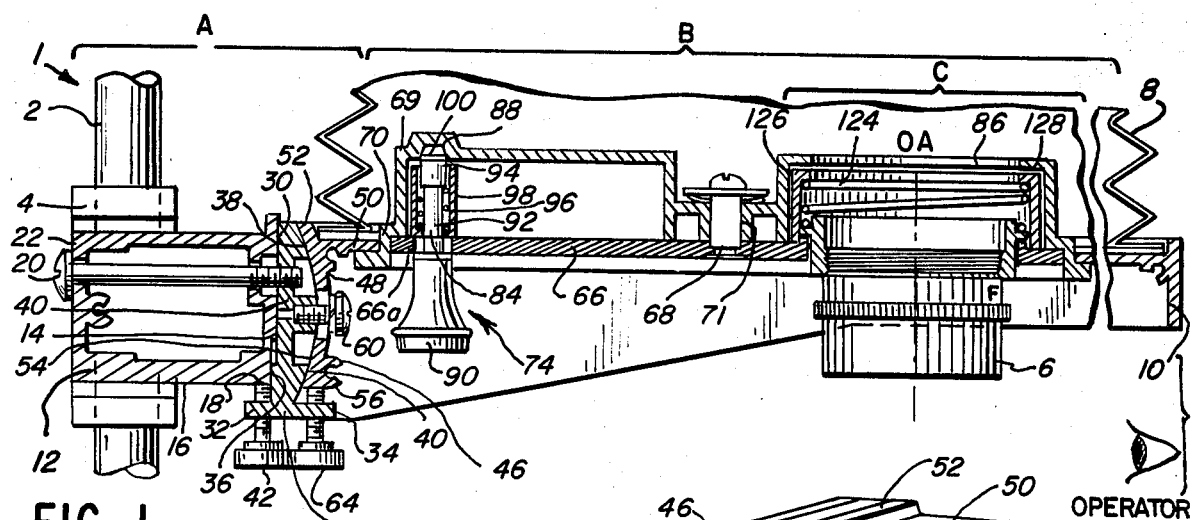
FIG. 1 is a sectional side view of a lens mounting system, according to the present invention, having pitch and alignment means, turret means and a rotatable lens mount.

Referring now to FIG. 1, an adjustable lens mounting system 1 is shown as might typically be used in a photographic enlarger. Although the invention will be described for use therein, it is to be understood that it is compatible with other systems utilizing lenses, such as cameras, projectors, optical benches, or the like. The lens system 1 is arranged to be longitudinally moveable on a vertical supporting or guiding column 2 by conventional drive means. A second guiding column may be used for additional support. An enlongated tubular focusing collar 4 around the guiding column 2 assists in selective vertical positioning of the lens stage to adjust the sharpness of the projected image by changing the distance along the optical axis OA between the lens element 6 and the negative carrier, not shown, positioned above light baffle means 8. This focusing adjustment places the transparency at a focal point of the lens element 6. It will be appreciated that the lens mounting system can be mounted for convenient use in a variety of orientations. For purposes herein, however, it is assumed that the operator of a photographic apparatus is viewing the lens mounting system 1 from the perspective shown in FIG. 1. It is useful to define a longitudinal axis extending from the front of a photographic apparatus to the rear, and a lateral axis extending from left to right with respect to the operator.

To facilitate an appreciation of the features of the present invention, alone and in combination, reference is made herein and in the accompanying drawings to pitch and roll alignment means A, turret means B and lens mount means C. Each of these acts in concert with lens element 6 and lens stage 10 to axially, horizontally or angularly change the position of lens element 6 with respect to optical axis OA.

Figure 2:
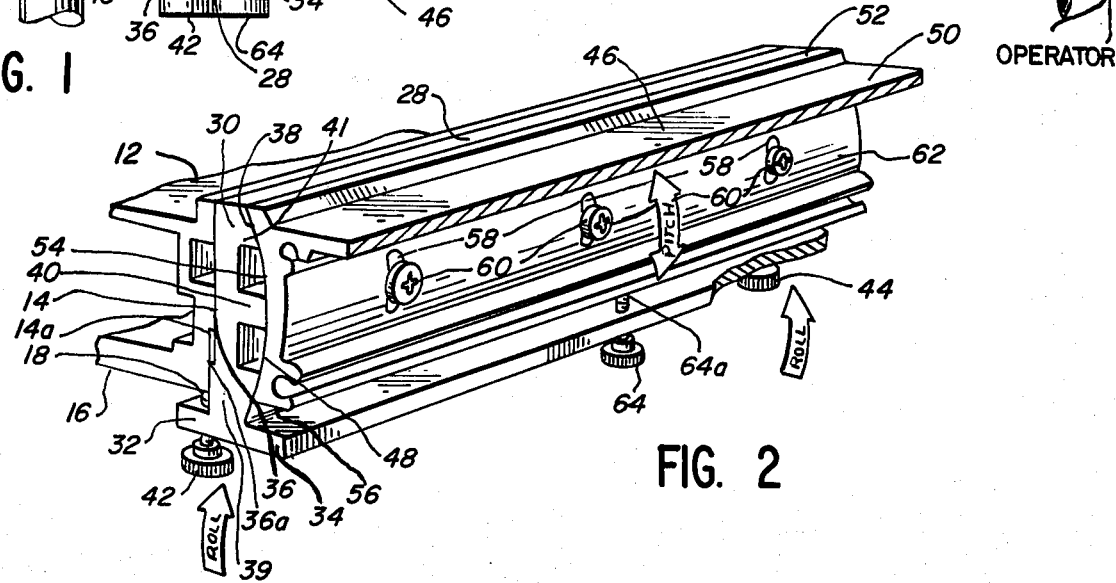
FIG. 2 is an enlarged sectional elevation perspective view of the pitch and alignment means of FIG. 1, illustrating a base member, an inverted T-shaped beam, a bracket means, and pivot and adjustment means therefor.

Referring also to FIG. 2, and using like numbers to assist in understanding the invention by denoting similar parts throughout the several views, a pitch and roll alignment means A is shown connecting the guiding column 2 and the lens stage 10. Alignment means A is supported for vertical movement on guiding column 2 by base member 12. Base member 12 is attached to the focusing collar 4 and may surround the guiding column 2. Base member 12 is shown from the side, and in perspective, as having a generally rectangular cross section that extends substantially along its entire length. The front pivot face 14 of base member 12 defines a generally flat bearing surface, although it may have grooves or channels cut therein to assist in its manufacture or to act as a built in stop. The generally flat bottom face 16 of base member 12 has a front portion which defines a bias surface 18. The other surfaces may be formed as necessary or desireable. Base member 12 may be extruded as a single metal or plastic piece to form a rigid load bearing structure.

Pivot bolt 20, or other fastener, inserted from the rear of lens mounting system 1, passes through the longitudinal center of base member 12 both at its rear wall 22 and at a central forward portion of its front face 14. Bolt 20 is threadably engaged by or fastened to the beam 28, which is mounted for pivotal face to face movement therewith.

Beam 28 is shown from the side, and in perspective, as having a generally inverted T-shaped cross section that extends substantially along its entire predetermined length, preferably coextensive with base member 12. Beam 28 has an upstanding center section 30, and at the bottom of said beam a rear shoe 32 and a forward shoe 34. A rear pivot face 36 of center section 30 is generally flat. A forward sliding face 38 of center section 30 is generally convex. As illustrated, face 38 is defined by the outermost surfaces of three longitudinally extending parallel portions 39, 40 and 41. Beam 28 may be extruded as a single metal or plastic piece.

The pivot bolt 20 is threaded into center section 30 of beam 28 at its longitudinal center. Thus, the forward pivot face 14 of base member 12 and the rear pivot face 36 of beam 38 are engaged to pivot around bolt 20 for sliding face to face angular movement. Such angular movement may be effected with threaded adjusting screws 42 and 44 extending upwardly in threaded engagement through rear shoe 32 of beam 28 substantially at opposing longitudinal ends of shoe 32. The ends of screws 42 and 44 abut the bias surface 18 of base member 12. By selectively adjusting screws 42 and 44, independently and in cooperation with each other, beam 28 can be pivotally rotated to a desired angular position with reference to base member 12 and locked in said angular position. The locking engagement is effected by the frictional contact forces of faces 14 and 36 in concert with the opposing moments about pivot bolt 20 created by both adjusting screws 42 and 44. For convenience of adjustment, said screws are fitted with knurled knobs. The amount of pivotal adjustment is limited by interference of bias surface 18 with shoe 32. Similarly, it may be limited by interference of opposing abutments 36a on the beam pivot face 36 and 14a on the base member pivot face 14.

A bracket means 46, having a preselected length preferably coextensive with base member 12, is slidingly associated with beam 28 at its convex face 38. Bracket means 46 is shown from the side, and in persective, as having a substantially vertical arcuate member 48 and a substantially horizontal member 50 rigidly attached thereto near the uppermost portion thereof at a generally right angle. Member 50 is affixed to leg 48 slightly below the uppermost edge 52 of leg 48. A rear sliding face 54 of member 48 is generally concave and its forward face 62 is generally convex when each is viewed along the lateral axis, the degree of curvature being substantially identical to that of the convex face 38 of beam section 30. The lower edge of member 48 forms a bias surface 56.

Laterally spaced elongated slots 58 are formed along the central longitudinal axis of member 48. Pivot screws 60, or other releaseable fasteners, are inserted through the slots from the forward substantially convex face 62 of member 48 into the central longitudinal portion 40 of beam 28. Assembled in this fashion, the convex forward sliding face 38 of beam 28 and the concave rear sliding face 54 of bracket means 46 are slidably engaged for selective rotational movement of bracket means 46 with respect to the longitudinal axis of beam 28. Such rotational movement is effected with a threaded adjusting screw 64. It is threadably engaged with and extends upwardly through the center of shoe 34. The contacting end 64a of screw 64 abuts bias surface 56 of member 48. By selectively adjusting screw 64, bracket means 46 can be pivotally rotatably adjusted to move the lens 6 in an up and down direction. Contiguous sliding alignment between faces 38 and 54 is maintained by the pin and slot engagement of screws 60 and holes 58. Once again, for convenience of adjustment, screw 64 is fitted with a knurled knob.

Referring to the overall embodiment of lens mounting system 1 in FIG. 1 the operation of pitch and roll alignment means A shall be described including lens stage 10 as rigidly attached to horizontal member 50 of bracket means 46. Pitch alignment, for selectively adjusting the rotation of lens stage 10 about its lateral axis, is effected in the cooperation of beam 28 and bracket means 46 as hereinabove described. Screws 60 are loosend, permitting relative movement between the beam 28 and bracket means 46. Thumbscrew 64 is rotated to assist in alignment. Once aligned, using a negative or focusing target, the screws 60 can be tightened to fix the setting. Roll alignment, for selectively adjusting the rotation of lens stage 10 about its longitudinal axis, is effected in the cooperation of base member 12 and beam 28, as hereinabove described, with adjustment of screws 42 and 44. Roll adjustments are transferred to lens stage 10 by the positive compressed linkage of beam 28 to bracket means 46.

Figure 3:
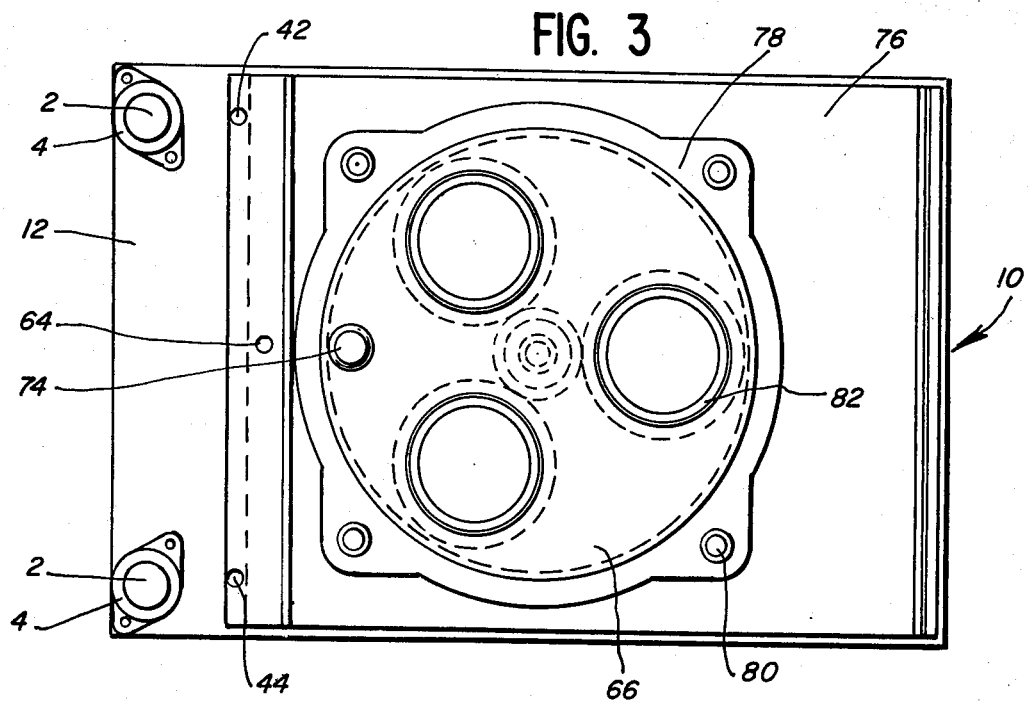
FIG. 3 is a bottom plan view of the invention of FIG. 1, showing a turret means having three separate lens mounts and an indexing pin.

The proposed pitch and alignment means A is universal in its application and may be used in combination with various turret means B and lens mount means C. Referring to FIGS. 1 and 3, a turret means B rotates a plurality of attached lens elements in and out of registration with the optical axis OA, and includes an indexing detent mechanism for releasably locking such turret means into a selected rotational position.

The illustrated turret means B comprises a circular disk turret plate 66 mounted on a center shaft 68. A circular, dished out turret housing 69 includes an annular lip 70 around its periphery to cooperate with the radial edge 66a of the turret plate 66. This mating surface provides a seat for the turret plate and preferably forms a light tight seal. The housing includes a hub 71 at its center to retain the turret shaft 68 by suitable journal means.

Referring to FIG. 3, the turret means B is shown affixed to the bottom face 76 of lens stage 10. Housing 69 is affixed to lens stage 10 by screws, rivets or other suitable fastening means 80. The turret plate 66 is retained by the shaft 68. In the illustrated embodiment, turret plate 66 is constructed with three receiving means 82 for three separate lens mount means C or lens mount elements 6. Turret plate 66 can be adapted for use with a number of different lens elements or lens mount means, and such variations are well within the scope of the present invention.

Turret means B further includes indexing means 74 to lock the turret plate in a predetermined location, including a retractable pin assembly 84 attached to plate 66 perpendicular thereto. The turret housing defines at least one receiving aperture to retain the end of the pin assembly 84. The remainder of the turret housing 69 has a general donut shape which is superposed above the turret plate 66. It is shaped as necessary or desireable to accomodate the lens elements and rotation thereof, with a single opening 86 defined in alignment with the optical axis OA.

Housing 69 is situated within light baffle means 8 and remains stationary while turret plate 66 and lens mount C are rotated with respect thereto. Thus, opening 86 remains in optical path OA at all times. Turret housing 69 has a receiving slot 88 correspondingly located 180° from the center of each respective lens mount means and lens element affixed thereto.

The retractable pin assembly 84 includes a gripping knob 90 attached to a pin 92 having a head 94 biased toward upward movement by spring 96, the spring being retained in and the vertical movement being directed by sleeve 98. Pin 92 extends through plate 66 near its perimeter. A cam shaped annular surface 100 is formed on the head 94 so as to guide the pin 92 into reception by the slot 88.

In operation of turret means B, gripping knob 90 is pulled down to unlock the turret plate, freeing it for rotation around shaft 68. The plate is rotated to move a lens mount means C or lens element 6 into registration with optical axis OA. Once positioned, gripping knob 90 is released and pin head 94 is urged into slot 88 by spring 96, whereupon lens element 6 is held in position.

Figure 4:
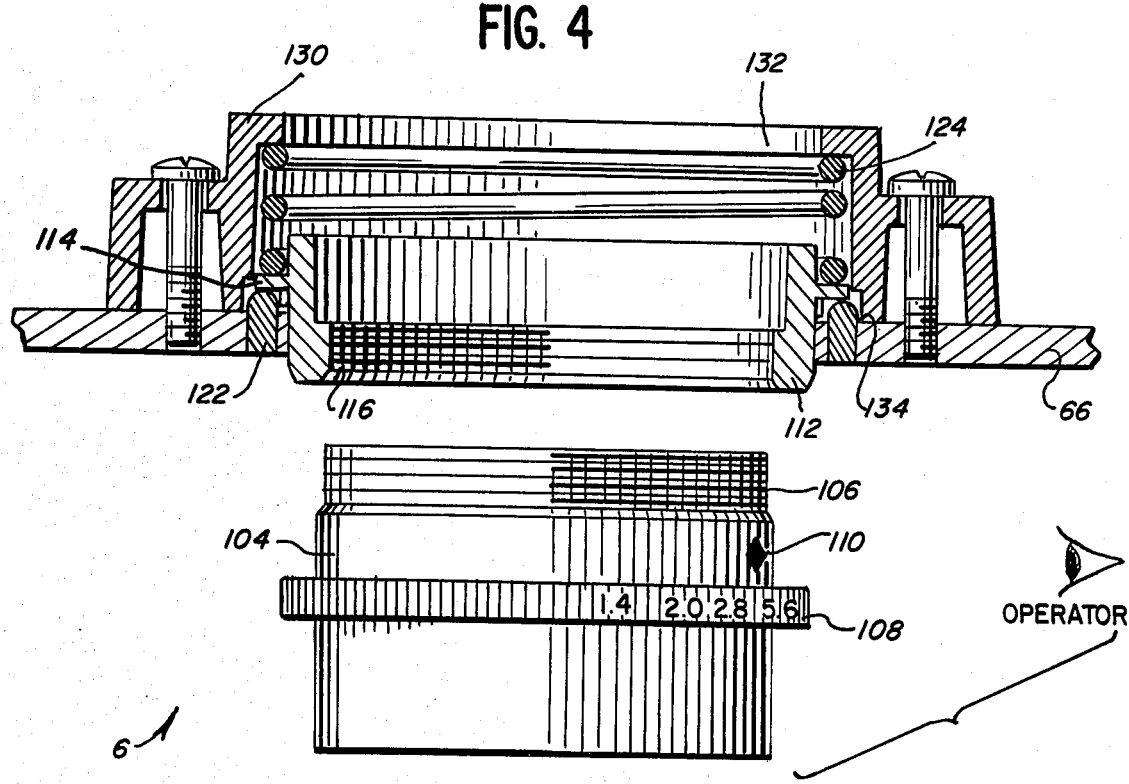
FIG. 4 is an enlarged sectional side view of the rotatable lens mount of FIG. 1, showing an uncoupled lens with an aperture scale rotated for convenient frontal viewing.
Figure 5:
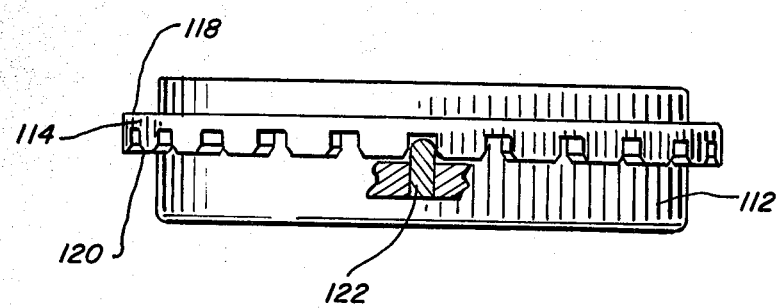
FIG. 5 is an enlarged front plan view of the lens element receiving tube of FIG. 4, showing registration means in the form of a toothed annular collar, and a partial sectional view of a clutch pin of mating configuration.

Referring to FIGS. 1, 4 and 5, a lens mount means C is shown which may be used with a standard lens stage or a turret assembly. Moreover, such lens mount means C may be used in combination with pitch and alignment means A. It is noted that lens mount means C, as illustrated, is particularly adapted to attach a screw-threaded lens element to a lens stage, camera or the like. This particular embodiment is used herein because of its improved nature and its suitability for photographic enlarger work. The above-described lens mounting assembly 1 is not restricted to use with a particular lens mount means, nor is any restriction intended.

Lens element 6, best shown in FIG. 4, includes an objective lens, not shown, mounted in a main support tube 104 having at a single end outer diameter a male screw thread 106. A lens aperture sleeve 108 is angularly adjustable with reference to the lens for adjusting the amount of light passing through the lens. Sleeve 108 is indexed with a series of f-stops marked in a scale which cooperates with an index 110, designated with a diamond shape, on the lens support tube 104. It is known in the art to use a light guide means to illuminate the f-stop scale. One object of the proposed lens mount means is to permit rotation of lens element 6 relative to lens stage 10 to position the index 110 for convenient viewing by an operator of the photographic apparatus.

A threaded lens element receiving tube 112 is provided having an annular toothed indexing collar 114. One end of tube 112 is formed with female threads 116 for coupling with the male threads 106 on lens element 6. The annular indexing collar may be formed in a cog-shaped configuration or it may be toothed as shown in FIG. 5, or it may take any form providing registration means as will be more fully described hereinafter. Indexing collar 114 has an upper biased surface 118 and a lower bearing surface 120.

Registration means, for selectively locking receiving tube 112 into a desired rotational position, are seen to comprise a clutch means in the form of a pin member 122 acting in cooperation with the indexing collar 114. It will be appreciated that any variety of indexing collars and pin members correspondingly shaped for locking engagement therewith may be employed. Moreover, two or more pin members may be employed, as illustrated.

Bias means in the form of a spring 124 act on biased surface 118 of collar 114 to hold the lens element receiving tube in place with bearing surface 120 against the top inside of, for example, turret plate 66. Spring 124 is held in compression against biased surface 118 by clip means which may vary with the lens mounting system. Referring to FIG. 1, for example, clip members 126 and 128 are used to hold spring 124 against biased surface 118 while still permitting the lens mount means C to rotate with the turret plate 66. As an alternative, a lens mount housing 130 having an open top 132, as shown in FIG. 4, may be used. To assist in maintaining alignment, the turret plate 66 or housing 130 should have an even bearing surface 134 such that no angular displacement of the lens element 6 results from the contact of collar lower bearing surface 120 and the turret plate or housing bearing surface.

In operation, the operator of the photographic apparatus screws the lens 6 into the tube 112 until the lens seats. If it is desired to rotate the lens, the operator simply pushes lens element 6, and the receiving tube 112 and annular indexing collar 114 associated therewith, upward against spring 124 and rotates the index 110 to the front of the photographic apparatus. When the operator releases lens element 6, spring 124 biases annular indexing collar 114 downward into locking registration with pin member 122.

It is believed that the embodiments herein illustrated and described accomplish all of the above enumerated objects and have made apparent a number of modifications which can be made in the invention disclosed by those having the benefit of the foregoing teachings without departing from the spirit and scope of these principles. Accordingly, it is intended that this invention be limited only by the scope of the appended claims.

What is claimed is:

1. An adjustable lens mounting comprising:
   a lens stage having a longitudinal axis extending from front to rear and a lateral axis extending from left to right, said lens stage including pitch alignment means for selectively adjusting the rotation of said lens stage about said lateral axis and roll alignment means for selectively adjusting the rotation of said lens stage about said longitudinal axis; and
   a lens mount means associated with said lens stage for positioning a lens element in the optical path.

2. The adjustable lens mounting of claim 1 wherein said pitch alignment means comprises:
   a beam of predetermined length with one side having a convex face;
   a bracket means of approximately said predetermined length having a concave face conforming substantially to the convex face of said beam; and
   means for maintaining the concave face of said bracket means in rotational sliding engagement with said convex face of said beam.

3. The adjustable lens mounting of claims 1 or 2 wherein said roll alignment means comprises:
   a base member of a predetermined length having a generally flat surface;
   a beam of approximately said predetermined length having a generally flat surface in contact with the flat surface of said base member; and
   means for maintaining the flat surface of said beam in sliding pivotal contact with the flat surface of said base member.

4. The adjustable lens mounting of claim 3 wherein said beam of predetermined length has an inverted T-shaped cross section with an upstanding center section and two outwardly extending shoes.

5. The adjustable lens mounting of claim 2 wherein said means for maintaining the concave face of said bracket means in rotational sliding engagement with said convex face of said beam comprises a pin and slot arrangement.

6. The adjustable lens mounting of claim 2 comprising one or more pivot screws threaded through vertical slots in said bracket means into said beam, the sliding movement between the contiguous convex and concave faces of said beam and bracket means, respectively, restricted by the movement of said pivot screws relative to said slots.

7. The adjustable lens mounting of claim 6 having three pivot screws equally and centrally spaced along said bracket means.

8. The adjustable lens mounting of claim 2 wherein said pitch alignment means further comprises adjustment means for pitch alignment of said bracket means with respect to said beam.

9. The adjustable lens mounting of claim 8 wherein said adjustment means comprises an adjusting screw biased against the lower edge of said concave face of said bracket means.

10. The adjustable lens mounting of claim 3 wherein said means for maintaining the flat surface of said beam in sliding pivotal contact with the flat surface of said base member comprises a pivot bolt connecting the centers of said beam and said base member.

11. The adjustable lens mounting of claim 3 wherein said roll alignment means further comprises adjustment means for roll alignment of said beam with respect to said base member.

12. The adjustable lens mounting of claim 11 wherein said adjustment means comprises two spaced adjusting screws abutting the lower edge of said base member flat surface substantially at each end.

13. The adjustable lens mounting of claims 1 or 2 wherein said lens mount means comprises a turret means rotatably mounted on said lens stage and selectively carrying a plurality of lens elements in and out of alignment with said optical path.

14. The adjustable lens mounting of claim 13 wherein said turret means includes indexing means for releasably locking into position a selected lens element.

15. The adjustable lens mounting of claim 14 wherein said indexing means comprises a detent member and a bore cooperatively receiving said detent member to prevent rotation of said turret means when a selected lens element is in registration with the optical path.

16. The adjustable lens mounting of claims 1 or 2 wherein said lens mount means comprises:

a threaded lens element receiving tube;

registration means for selectively rotatably positioning said receiving tube with respect to said lens stage; and bias means for releasably holding said receiving tube in fixed relation with said lens stage.

17. The adjustable lens mounting of claim 16 wherein said bias means comprises a spring coacting with said registration means to selectively and releasably fix rotation of said receiving tube.

18. The adjustable lens mounting of claim 16 wherein said registration means comprises an annular indexing collar integral with said receiving tube and a clutch means for releasably locking to a selected rotational position said indexing collar and receiving tube attached thereto.

19. The adjustable lens mounting of claim 18 wherein said indexing collar is of a cog-shaped configuration.

20. The adjustable lens mounting of claim 18 wherein the upper portion of said indexing collar is flat and the lower portion of said collar is toothed.

21. The adjustable lens mounting of claim 18 wherein said clutch means comprises fixed pin member means correspondingly shaped for locking engagement with said annular indexing collar.

22. An improved lens mount of the screw-coupling type wherein the improvement comprises:

a lens housing, said lens housing having an open end for light passage therethrough and a mating end with an annular shoulder for coupling with a lens assembly;

a threaded lens element receiving tube disposed inside said lens housing and, said tube having an annular toothed collar with a lower bearing surface and an upper biased surface;

registration means for selectively locking into position said receiving tube with respect to said lens housing; and a coiled spring of substantially equal diameter to said receiving tube, said spring acting on said biased surface to force said bearing surface into contact with said annular shoulder, whereby said lens assembly may be pushed against said spring and rotatably positioned with respect to said lens housing.

23. The lens mount of claim 22 wherein said registration means comprises one or more pin members located in said annular shoulder, said pin members correspondingly shaped for locking engagement with said annular toothed collar.

* * * * *